US012793574B2

(12) United States Patent
Cempla et al.

(10) Patent No.: US 12,793,574 B2
(45) Date of Patent: Nov. 10, 2026

(54) DEVICE AND SYSTEM FOR SIMULATING TRANSCATHETER OPERATIONS

(71) Applicant: Medical Simulation Technologies SP. Z O.O, Cracow (PL)

(72) Inventors: Michal Cempla, Cracow (PL); Tomasz Dziwinski, Rybnik (PL); Pawel Piatek, Cracow (PL); Andrzej Gackowski, Cracow (PL)

(73) Assignee: Medical Simulation Technologies SP. Z O.O, Cracow (PL)

( * ) Notice: Subject to any disclaimer, the term of this patent is extended or adjusted under 35 U.S.C. 154(b) by 741 days.

(21) Appl. No.: 18/037,827

(22) PCT Filed: May 28, 2021

(86) PCT No.: PCT/EP2021/064436
§ 371 (c)(1),
(2) Date: May 19, 2023

(87) PCT Pub. No.: WO2022/117235
PCT Pub. Date: Jun. 9, 2022

(65) Prior Publication Data

US 2024/0005817 A1 Jan. 4, 2024

(30) Foreign Application Priority Data

Dec. 4, 2020 (PL) ................................. 20461588.4

(51) Int. Cl.
*G09B 23/28* (2006.01)

(52) U.S. Cl.
CPC ................................. *G09B 23/285* (2013.01)

(58) Field of Classification Search
CPC ........ G09B 23/285; G09B 23/28; G09B 9/00; A61B 34/10; A61M 25/00
USPC .................................. 434/262, 267; 600/424
See application file for complete search history.

(56) References Cited

U.S. PATENT DOCUMENTS

| | | | | |
|---|---|---|---|---|
| 4,642,055 A * | 2/1987 | Saliterman | G09B 23/285 434/268 |
| 6,267,599 B1 | 7/2001 | Bailey | |
| 6,705,871 B1 * | 3/2004 | Bevirt | A61B 34/76 434/262 |
| 2006/0127864 A1 * | 6/2006 | Ohlsson | G09B 23/285 434/219 |

FOREIGN PATENT DOCUMENTS

| | | |
|---|---|---|
| WO | 9803954 A1 | 1/1998 |
| WO | 03050783 A1 | 6/2003 |
| WO | 2004051602 A1 | 6/2004 |

OTHER PUBLICATIONS

European Patent Office, International Search Report, PCT/EP2021/064436, dated Aug. 11, 2021, 2 pages.

* cited by examiner

*Primary Examiner* — Xuan M Thai
*Assistant Examiner* — Zachary Joseph Pollock
(74) *Attorney, Agent, or Firm* — Ziegler IP Law Group, LLC.

(57) ABSTRACT

A device designed for improving the skills necessary to perform operations, by practising on a machine that simulates the properties of selected body parts of living organisms. More specifically, electromechanical devices/systems for practising transcatheter operations with the use of surgical instruments.

8 Claims, 3 Drawing Sheets

DEVICE AND SYSTEM FOR SIMULATING TRANSCATHETER OPERATIONS

FIELD

The aspects of the disclosed embodiments relate to the field of devices/systems designed for improving the skills necessary to perform operations, by practising on a machine that simulates the properties of selected body parts of living organisms. More specifically, the aspects of the disclosed embodiments concern electromechanical devices/systems for practising transcatheter operations with the use of surgical instruments.

BACKGROUND

In addition to practising on animals and cadavers, people who wish to improve their skills necessary to perform medical procedures may also train using simulators of body organs, e.g. the heart, before they start performing such operations on living people. However, creating a faithful model of organs entails many difficulties and there are various training systems adapted so as to improve specific skills.

Development of devices for practising transcatheter interventions is complicated because they have to measure many coaxial instruments very precisely and simulate physical phenomena such as the strength of frictional resistances or the strength of the pulsations and movements of organs, which are felt by the trainee holding the instruments in his/her hands.

In the state of the art, there are known devices/systems that reproduce at least some of the properties of the human body and can be used to improve the skills necessary to perform transcatheter operations. US2006127864A1 reveals a device for practising the performance of such operations, which uses a system of several trolleys that can move along a single straight line, as well as a system measuring the position of each of these trolleys. The user enters the surgical instruments through an opening in the device, thus achieving contact with the trolleys, and obtains feedback in the form of computer visualization of the position of the surgical instruments and physical stimuli-resistance generated by the trolleys. Such a solution is disadvantageous due to the greater complexity of electronic sensors for measuring linear displacement in comparison with sensors for measuring the angle of rotation in the case of rotational motion. The drive that makes it possible to exert physical stimuli (the so-called "force feedback") is more complicated for linear motion than for rotational motion too. In the cited patent, the authors require the use of telescopic tubes between the carriages, which increases the cost and reduces the reliability of the proposed solution (as time passes, dirt between the segments will negatively impact the functioning of the device). Moreover, the solution revealed in said document requires relatively much space for the longitudinal movements of the trolleys.

Also, document U.S. Pat. No. 6,267,599B1 describes a device for practising the performance of transcatheter interventions, in which the surgical instrument is introduced along a straight line. Therefore, this solution—although more compact—is characterized by a more difficult reproduction of said physical stimuli.

In view of the above, it would be desirable to develop a system for simulating transcatheter operations that would offer much better simulative modulated friction and pulsation forces of organs related to the handling of surgical instruments.

SUMMARY

The subject matter of the disclosed embodiments is a device for measuring the position of a surgical instrument, fitted with at least two limiters, wherein each limiter has a pass-through opening smaller than at least one part of the surgical instrument, through which parts of the surgical instrument are to be inserted, characterized in that it is in the shape of a rotationally mounted disk, which, on the inner side of its envelope, has a track that serves as a guide for the surgical instrument, wherein the first limiter is attached to the disk at one of the ends of said track and is configured so that when the surgical instrument is brought to the first stop and a part of the surgical instrument that is larger than the opening in the first limiter is pressed against the first limiter, rotation of the disk is caused, wherein at least one other limiter is attached to the disk by means of a pivotal measuring arm, and bringing a part of the surgical instrument that is larger than the opening in that other limiter to the second limiter and pressing it against said second limiter causes the second limiter to move, wherein the pass-through opening for inserting the surgical instrument in said at least one other limiter is smaller than the pass-through opening for inserting the surgical instrument in the limiter that precedes it when viewed from the side from which the surgical instrument is to be inserted, in particular, smaller than the pass-through opening for inserting the surgical instrument in the first limiter, wherein the disk and each of the limiters are fitted with means of resistance that act—with an appropriately matched force or torque—on the disk and on each of the limiters counteracting their movement under the influence of the pressure from the surgical instrument, wherein the device additionally has means for measuring the angle of rotation of the disk and the angle of pivoting of each of at least one measuring arm and converting the measurement result into an electrical signal.

Preferably, the means of measuring the angle of rotation of the disk take the form of an angle sensor such as an absolute encoder, incremental encoder, potentiometer, or resolver.

Preferably, the means of measuring the angle of pivoting of each of at least one measuring arm take the form of an angle sensor such as an absolute encoder, incremental encoder, or potentiometer.

Preferably, the device is fitted with jaws for locking the surgical instrument, configured so as to lock the surgical instrument in its target position and to unlock it only after the disk returns to its initial/base position.

Preferably, the device has three limiters.

Preferably, the device has four limiters.

Preferably, the device additionally has a guiding element attached to the disk and configured so as to redirect the surgical instrument being inserted from above in relation to the plane of rotation of the disk in the direction concurrent to the track of the disk.

Preferably, all the means of resistance are properly selected from the group of means that comprises springs, parts made of an elastomer, and an electric motor.

Preferably, at least one limiter apart from the first limiter is mounted on a ring that is attached on the external surface of the disk or on a linear guide.

Preferably, it also has optical sensors located behind the first limiter, configured so as to measure the orientation of the surgical instrument.

Preferably, the device additionally has accelerometric sensors located in the casing/handle of the surgical instrument, configured so as to measure the orientation of the surgical instrument.

Preferably—instead of openings smaller than the relevant parts of the surgical instrument—the limiters comprise means of locking the specific part of the surgical instrument, either in the form of a brake or means magnetically affecting the specific part of the surgical instrument.

The subject matter of the disclosed embodiments is also a system for simulating transcatheter operations, which includes:

- a manikin,
- a surgical instrument, especially of the kind used to carry out transcatheter operations,
- a device for measuring the position and, optionally, the orientation of the surgical instrument interacting with the elements of the device, placed inside the manikin,
- a computing device adapted to converting data about measurement of the position and, optionally, orientation of the surgical instrument, as well as to displaying images corresponding to the specific position and optional orientation of the surgical instrument, characterized in that it comprises the device of the invention for measuring the position of the surgical instrument.

BRIEF DESCRIPTION OF THE DRAWINGS

The aspects of the disclosed embodiments will be presented in more detail in preferable embodiments and with reference to the enclosed drawing, where.

NUMERICAL MARKINGS

1—surgical instrument
2*a*—first limiter
2*b*—second limiter
3—disk
4—track
5—pivotal measuring arm
6—guiding element
7—manikin
8—computing device with a screen

DETAILED DESCRIPTION

Figure 1:
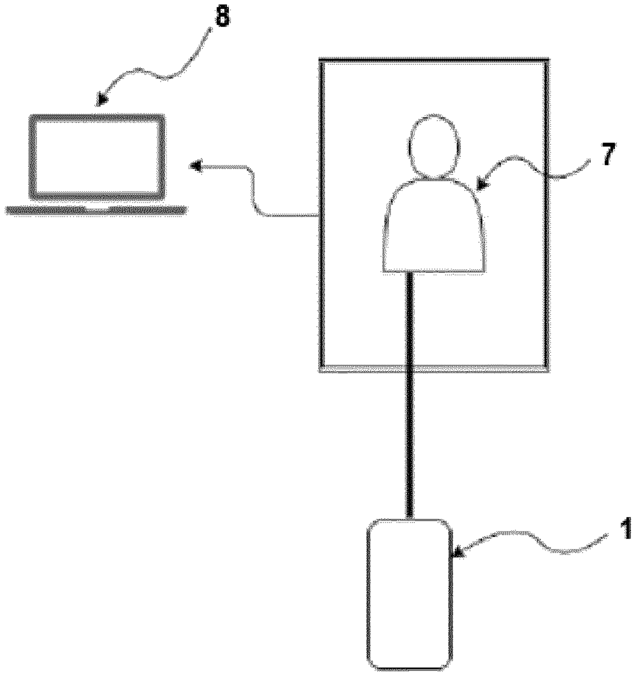
FIG. 1 shows a general diagram of the simulation system of the invention.

FIG. 1 presents a general diagram of the simulation system of the invention, in which three main factors can be distinguished: the manikin 7 fitted with the device for measuring the position of the surgical instrument 1, the surgical instrument 1, and the computing device with a screen 8, in this case a computer. The computing device 8, especially a computer, is connected to the manikin 7 as well as to the device that is inside of it, and is adapted so as to receive information about the current position and orientation of individual elements of the surgical instrument(s) 1. Based on the information that reach the computing device 8, images are generated on its screen, which simulate the actual objects that would be seen by the person performing the operation.

Figure 2:
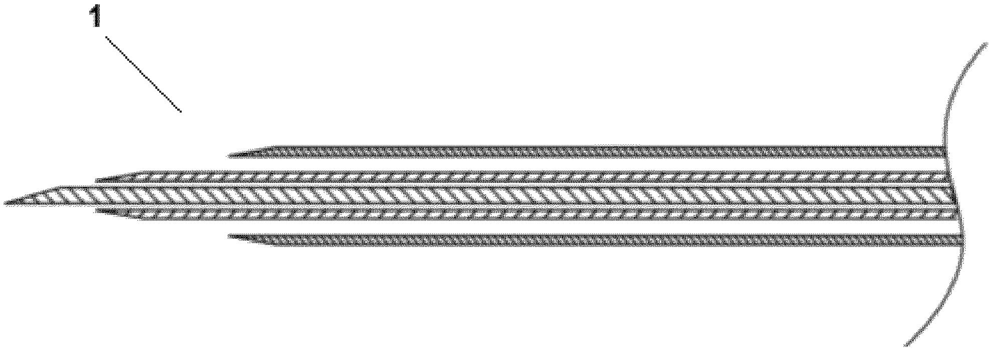
FIG. 2 shows an example sectional view of an instrument designed for transseptal puncture.
Figure 3:
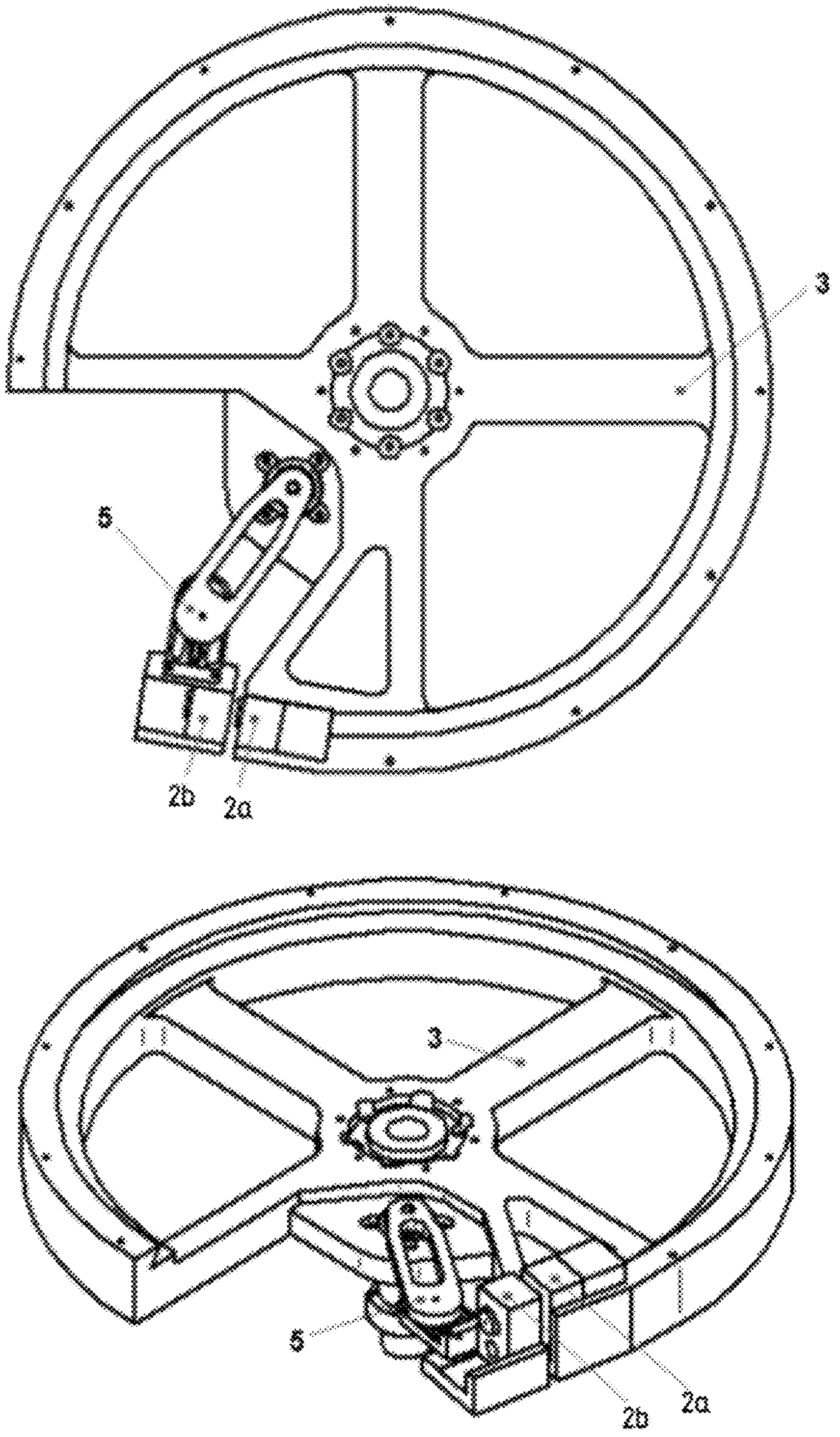
FIG. 3 shows two projections of the main elements of the device for measuring the position of the surgical instrument.
Figure 4:
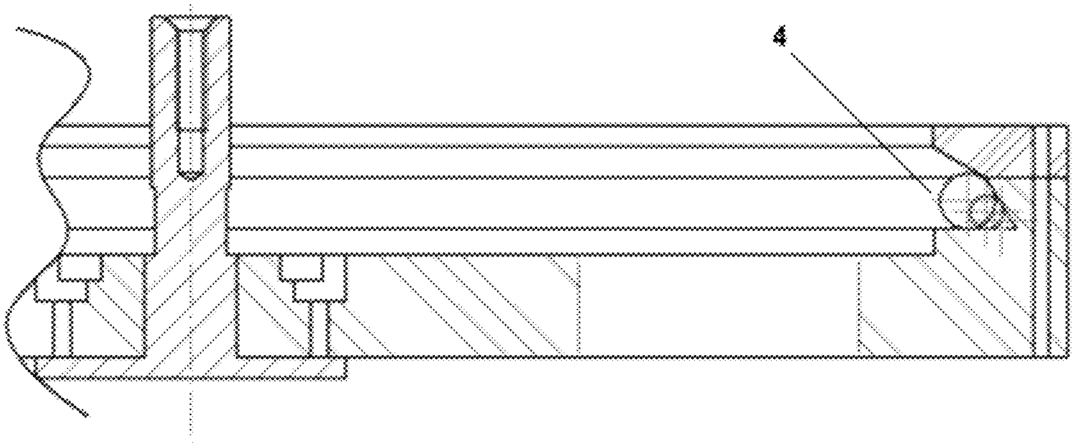
FIG. 4 shows a sectional view through the disk of the device seen in FIG. 3.

As can be seen in FIG. 3, the main part of the device for measuring the position of surgical instruments 1 is a spatially shaped rotationally mounted disk 3. On the inner side of the envelope of the disk 3 (cf. FIG. 4) there is a track 4 that is a kind of guide for the surgical instrument 1, which track 4 can be milled to ensure accuracy of execution if the disks 3 are made of metal. Said track 4 is generally V-shaped (cf. FIG. 4) with the vertex closer to the outer lateral surface of the disk 3. Thanks to the tapered profile of the track 4, knowing its exact geometry and knowing the geometry (size—especially the diameter) of the elements of the surgical instruments 1 (cf. FIG. 2), it is possible to precisely determine the path (radius of the circle) along which the given instrument 1 (or part thereof) moves.

The disk 3 is rotationally mounted on an axle and can rotate under the influence of the surgical instrument 1 being inserted along the track 4 when it encounters an obstacle—the first limiter 2*a*—and starts pushing against it. The force needed to cause rotation of the disk 3 can be adjusted using the first means of resistance, e.g., a spring, a part made of an elastomer, or an electric motor, which means are connected to the shaft/axle on which the disk 3 is mounted. By exerting torque on the disk 3, the following are ensured: return of the disk 3 to its initial position, and constant contact between the tip of the surgical instrument 1 and the first limiter 2*a*, which is important for accurately measuring the position of said instrument 1. In addition, by modulating the torque, it is possible to achieve the effect of a friction force and pulsation that simulate, e.g., touching the wall of, say, a beating heart with the instrument 1. In turn, by appropriately selecting or replacing the first means of resistance, it is possible to simulate the behaviour of different parts of the human body, i.e., those that create more resistance and those that create less resistance to surgical instruments 1 being inserted through them.

The rotation of the disk 3 in relation to its initial position is measured using the angle sensor, e.g., an absolute encoder, incremental encoder, potentiometer, or resolver.

Another part of the device for measuring the position of surgical instruments is a second limiter 2*b* of the set of limiters 2, which, like those known from the document US2006127864A1, successively prevent the possibility of the widest parts of the surgical instrument 1 passing through, but enable smaller elements (e.g. with a smaller diameter) to pass through (cf. FIG. 2). In the device of the invention, said set of limiters includes at least two limiters 2*a* and 2*b*.

The first limiter 2*a* is attached to the disk 3 at one of the ends of the V-shaped track 4—this first limiter 2*a* is smaller than the size (e.g. diameter) of the widest part of the specific surgical instrument 1, but allows the second largest part of that surgical instrument 1 to pass through. When the surgical instrument 1 rests on the first limiter 2*a*, further insertion of the surgical instrument 2 causes rotation of the disk 3 and causes a return torque generated by the first means of resistance.

The second limiter 2*b* is attached to the disk 3 by means of the pivotal measuring arm 5, and is positioned so that its opening is coaxial to the opening in the first limiter 2*a*. After the surgical instrument 1 (the widest part thereof) rests against the first limiter 2*a* and after the narrower parts of the surgical instrument 1 are further inserted, the second part of the instrument 1 rests against the second limiter 2*b* that begins to move under the pressure (i.e. begins to pivot on the measuring arm 5). The measuring arm 5, on which the second limiter 2*b* is mounted, is essentially rigid and is connected to the means of measuring its pivoting, as well as to the second means of resistance that exert torque on the arm 5 which torque ultimately brings the arm 5 together with the second limiter 2*b* to the initial position next to the first limiter 2*a*. Preferably, the second means of resistance are analogous to the first means of resistance.

An appropriate number of limiters (i.e. proportionate to the number of concentric instruments) are connected to the disk 3 together with their means of attachment, especially measuring arms 5—like in the case of the second limiter 2*b* described above. Preferably, the total number of limiters is two, three, four, or five limiters, including the first limiter 2*a* attached to the disk 3.

Although it has been described above that the second limiter 2*b* is mounted on the measuring arm 5, in other embodiments the second limiter 2*b* and further limiters may also be mounted on a different kind of mounting element, e.g., a ring attached to the external surface of the disk 3 or on a linear guide. The means of resistance that exert force/torque on the specific limiter and the means of measuring their position are selected according to the applied types of mountings for the limiters.

During work, the computing device 8 processes all the data coming from the device for measuring the position of the surgical instruments 1 and determines the exact position of the surgical instrument 1, displaying images that correspond to the obtained results.

Figure 5:
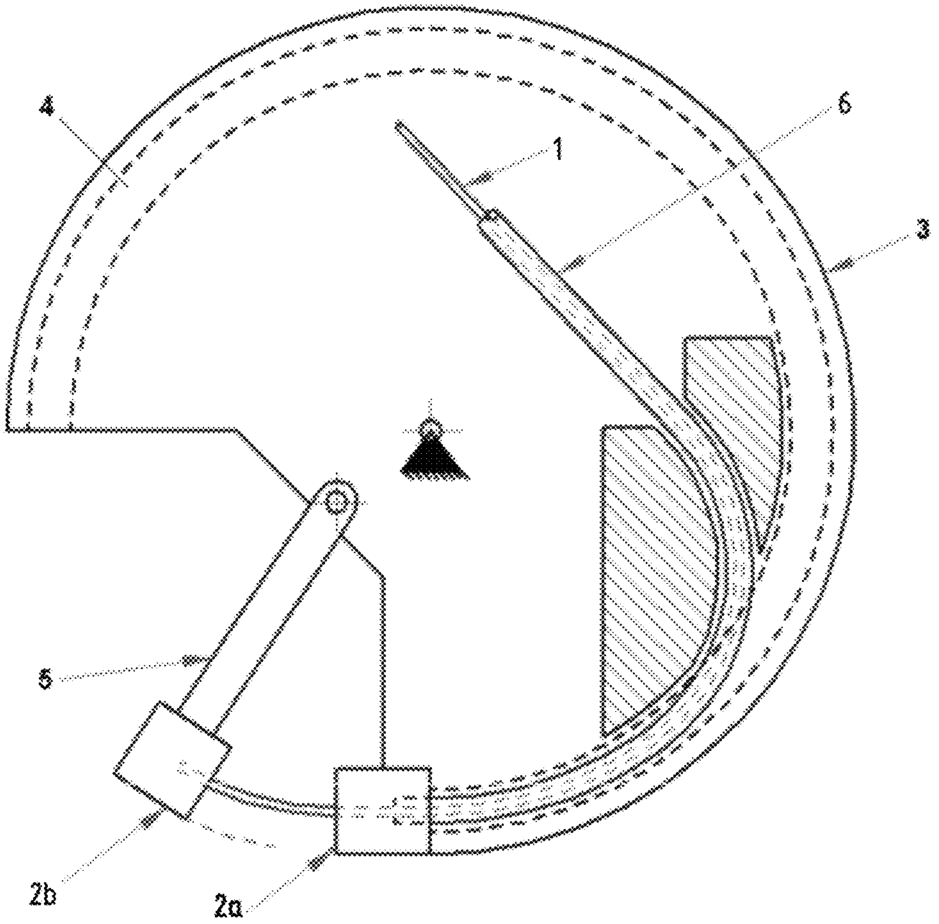
FIG. 5 shows a diagrammatic view and a top view of the position measuring device with a surgical instrument inserted into it.

Another preferable element of the system of the invention is the guiding element 6 (the element marked with lines in FIG. 5), which allows proper insertion of the surgical instrument 1 into the track 4 in the disk 3. The surgical instrument 1, being inserted into the manikin 7, preferably approaches the disk 3 from the top in relation to the disk's 3 plane of rotation. The guiding element 6 redirects the surgical instrument 1 in the direction concurrent to the track 4 in the disk 3.

The advantage of the device of the invention and of the system fitted with said device is also the fact that they use fewer moving parts than the solutions known in the state of the art, which increases their reliability, which reliability can be further increased by the use of sealed bearing elements eliminating any penetration of dirt.

What is claimed is:

1. A device for measuring a position of a surgical instrument, fitted with at least two limiters, wherein each limiter of the at least two limiters has a pass-through opening smaller than at least one part of the surgical instrument, the pass-through opening configured to receive other parts of the surgical instrument that are narrower than the at least one part, wherein the device is a rotationally mounted disk, which, on an inner side of an envelope of the rotationally mounted disk, has a track that serves as a guide for the surgical instrument, wherein a first limiter of the at least two limiters is attached to the rotationally mounted disk at one of an ends of said track and is configured so that when the surgical instrument is brought to the first limiter and the at least one part of the surgical instrument that is larger than the pass-through opening in the first limiter is pressed against the first limiter, rotation of the rotationally mounted disk is caused, wherein a second limiter of the at least two limiters is attached to the rotationally mounted disk by means of a pivotal measuring arm, and bringing the at least one part of the surgical instrument that is larger than the pass-through opening in the second limiter and pressing the part of the surgical instrument against said second limiter causes the second limiter to move, wherein the pass-through opening in the second limiter is smaller than the pass-through opening in the first limiter, and the first limiter precedes the second limiter from a side from which the surgical instrument is brought to the first limiter, wherein the rotationally mounted disk and each of the first limiter and the second limiters are fitted with means of resistance that act with an appropriately matched force or torque on the rotationally mounted disk and on each of the first limiter and the second limiter counteract their movement under the influence of pressure from the surgical instrument, wherein the device additionally has means for measuring an angle of rotation of the rotationally mounted disk and an angle of pivoting of the measuring arm and converting a measurement result into an electrical signal.

2. The device according to claim 1 wherein the means of measuring the angle of rotation of the disk is an angle sensor comprising one or more of an absolute encoder, an incremental encoder, a potentiometer, or a resolver.

3. The device according to claim 1 wherein the means of measuring the angle of pivoting of the measuring arm is an angle sensor comprising one or more of an absolute encoder, an incremental encoder, or a potentiometer.

4. The device according to claim 2, wherein the device comprises a guiding element attached to the disk, the guiding element being configured to redirect the surgical instrument being inserted from above in relation to a plane of rotation of the disk in a direction of the track of the disk.

5. The device according to claim 1, wherein the means of resistance comprise one or more of springs, parts made of an elastomer, and an electric motor.

6. The device according to claim 1, wherein the device comprises optical sensors located behind the first limiter, configured to measure the orientation of the surgical instrument.

7. The device according to claim 1, wherein the device comprises accelerometric sensors located in one or more of a casing/or a handle of the surgical instrument, configured so as to measure the orientation of the surgical instrument.

8. A system for simulating transcatheter operations, which includes:

a manikin, a surgical instrument configured to carry out transcatheter operations, a device for measuring a position and an orientation of the surgical instrument interacting with elements of the device, placed inside the manikin, a computing device-configured to convert data about measurement of the position and, the orientation of the surgical instrument, and display images corresponding to a specific position and a specific orientation of the surgical instrument, wherein the device further comprises at least two limiters, wherein each limiter of the at least two limiters has a pass-through opening smaller than at least one part of the surgical instrument, the pass-through opening configured to receive other parts of the surgical instrument that are narrower than the at least one part, wherein the device in a rotationally mounted disk, which, on an inner side of an envelope of the rotationally mounted disk, has a track that serves as a guide for the surgical instrument, wherein a first limiter of the at least to limiters is attached to the rotationally mounted disk at one end of said track and is configured so that when the surgical instrument is brought to the first limiter and the at least one part of the surgical instrument that is larger than the opening in the first limiter is pressed against the first limiter, rotation of the rotationally mounted disk is caused, wherein a second limiter is attached to the rotationally mounted disk by means of a pivotal measuring arm, and bringing the at least one part of the surgical instrument that is larger than the opening in second limiter and pressing the surgical instrument against said second limiter causes the second limiter to move, wherein the pass-through opening in said first limiter is smaller than the pass-through opening in the second limiter, and the first limiter precedes the second limited from a side from which the surgical instrument is brought to the first limiter, wherein the rotationally mounted disk and each of the first limiter and the second limiter are fitted with means of resistance that act with a matched force or torque on the rotationally mounted disk and on each of the first limiter and the second limiter counteracting their movement under the influence of the pressure from the surgical instrument, wherein the device additionally has means for measuring an angle of rotation of the disk and an angle of pivoting of the measuring arm and converting a measurement result into an electrical signal.

* * * * *